Mar. 20, 1923.  1,449,243
H. C. PECKHAM ET AL.
PROCESS FOR MAKING CASTELLATED NUTS.
FILED JUNE 1, 1921.  2 SHEETS—SHEET 1.
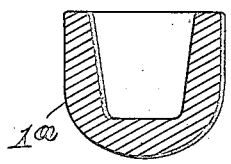
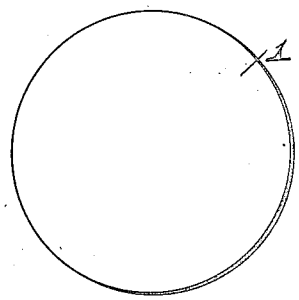
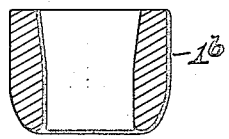
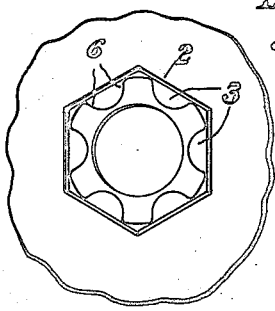
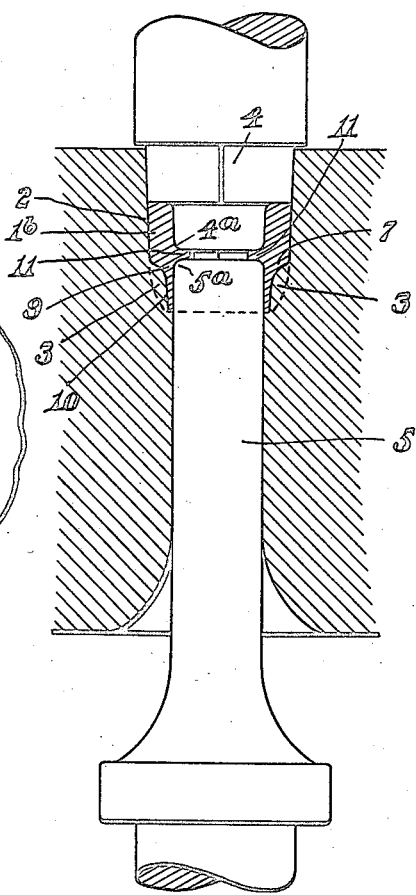
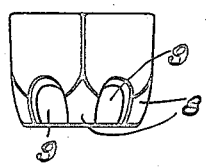
Inventors:
Harold Caldwell Peckham
Herbert D. Swets Mar. 20, 1923.
H. C. PECKHAM ET AL.
PROCESS FOR MAKING CASTELLATED NUTS.
FILED JUNE 1, 1921.
1,449,243.
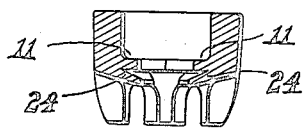
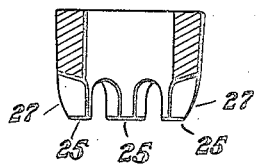
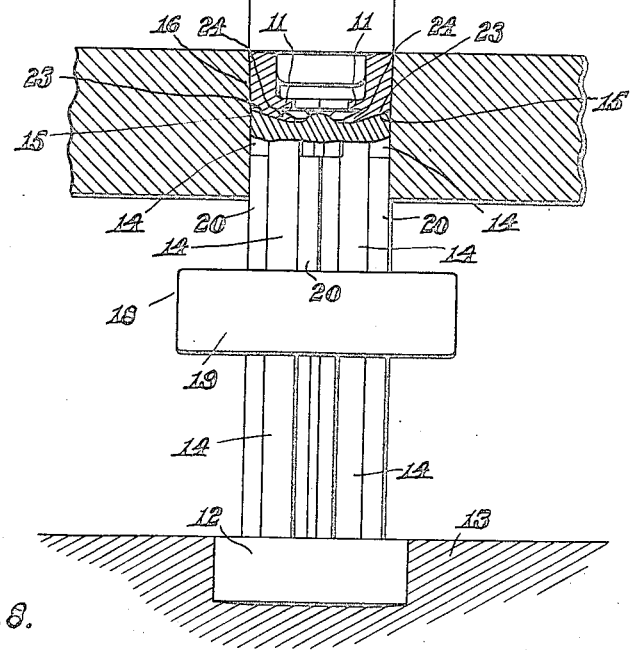
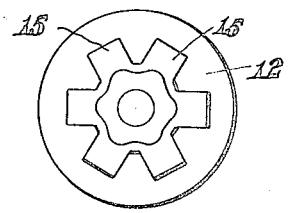
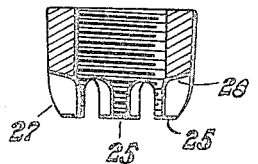
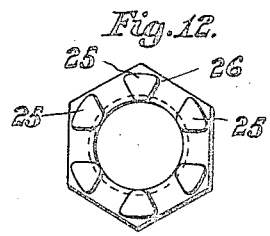
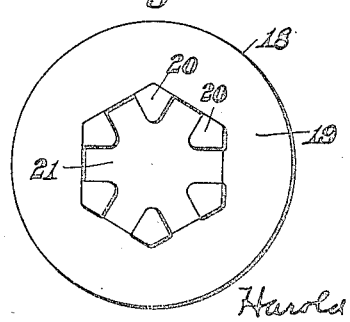
Inventors:
Harold Caldwell Peckham
Herbert P. Livett Patented Mar. 20, 1923.

1,449,243

UNITED STATES PATENT OFFICE.

HAROLD CALDWELL PECKHAM, OF CRANSTON, AND HERBERT P. SWEET, OF PROVIDENCE, RHODE ISLAND; SAID SWEET ASSIGNOR OF HIS RIGHT TO DUTEE W. FLINT, OF PROVIDENCE, RHODE ISLAND.

PROCESS FOR MAKING CASTELLATED NUTS.

Application filed June 1, 1921. Serial No. 474,209.

*To all whom it may concern:*

Be it known that we, HAROLD CALDWELL PECKHAM, a citizen of the United States, residing at Cranston, in the county of Providence and State of Rhode Island, and HERBERT P. SWEET, a citizen of the United States, residing at Providence, in the county of Providence and State of Rhode Island, have invented new and useful Improvements in Processes for Making Castellated Nuts, of which the following is a specification.

In previous processes of making castellated nuts, the castellations have usually been formed by cutting out portions of the metal, usually by several operations of a cutter across the nut. More recently, mechanism and processes have been devised for making such nuts by compression, the nuts being formed from blanks compressed between a die or socket member and a co-acting stud member, one of said parts carrying projections which form the castellations on the nut. Such processes and apparatus are shown in the patents to F. O. Jaques, Jr., No. 1,311,449 and No. 1,314,668. Our invention relates to processes of the general type covered by said Jaques patents, and results in the production of a nut having not only the advantages of the nut produced by the apparatus and methods shown in said Jaques patents, but other advantages as well.

The object of our invention is to improve upon the methods disclosed by said Jaques patents.

Our invention consists in new and improved methods of forming the castellations on the nut blank, as will be more fully set forth hereinafter, the same resulting in preventing breakage of the dies and insuring longer life of the operating parts, and also in an improved nut.

We do not in this application claim the apparatus herein described, nor the new form of nut produced by the methods herein described, said apparatus and said improved form of nut being claimed in divisional applications filed by us.

Referring to the accompanying drawings, in which like numerals designate like parts, Fig. 1 represents a metal blank, herein shown as circular in form, but which may be of other shapes, as, for instance, hexagonal. Fig. 2 shows said blank formed into cup shape by apparatus which it is unnecessary to describe herein. Fig. 3 illustrates the same cup-shaped blank after it has been subjected to a punching operation to remove the bottom of the cup, the apparatus by which this is effected being of any suitable form. Fig. 4 shows in section an apparatus for partially forming the castellations upon a nut blank, the nut blank shown in place in said apparatus being of the form illustrated in Fig. 3. We prefer to use a blank in this tubular form, since this form of blank can be successfully treated in our apparatus with much less pressure than a solid blank. It will be understood, however, that the nut blank treated in said apparatus need not necessarily be of this tubular form. Fig. 5 is a plan view of the die or socket member disclosed in Fig. 4, showing the castellation forming projections in the socket member. Fig. 6 is an elevation of the blank shown in Fig. 3 after the same has been subjected to operation in the apparatus disclosed in Figs. 4 and 5, whereby partial castellations are formed on the blank. Fig. 7 shows, partly in section, an apparatus for completing the formation of castellations on the nut blank. Fig. 8 is a plan view of the castellation forming member illustrated in Fig. 7. Fig. 9 is a plan view of the knockout member constituting a part of the apparatus disclosed in Fig. 7. Fig. 10 shows the nut blank illustrated in Fig. 7, in section, after the same has been subjected to treatment in the apparatus shown in Fig. 7. Fig. 11 shows the same blank, in section, after it has been subjected to a further punching operation in apparatus of suitable type not herein shown, to remove projecting metal remaining in the interior of the bore of the nut after the operation of the apparatus disclosed in Fig. 7. Fig. 12 is a plan view of the same looking toward the castellated end of the nut. Fig. 13 shows, in section, the nut illustrated in Fig. 11 in finished form after the screw-thread has been tapped therein.

In the drawings, 1 indicates the metal blank, which, as shown, is in circular form, and may be stamped from sheet metal or cut from bar metal. We prefer before subjecting the blank to the castellating operation, first to form it into cup shape 1ª, as shown in Fig. 2, by forcing it through a draw die, which may be of any desired form, and then to cut away the bottom portion of said cup by a punching operation, which also may be performed with any suitable apparatus. These operations on the blank may or may not be performed in apparatus adapted to give to the exterior of the blank the hexagonal shape which the finished nut will have. The blank 1b in tubular form with rounded end, as shown in Fig. 3, is now ready for the castellating apparatus. It should be understood, as aforesaid, that although we prefer this form of blank, we do not confine our invention to the use of a blank in this form.

Referring to the apparatus shown in Fig. 4, 2 indicates a die or socket member in which the nut blank of Fig. 3 is placed as indicated, said socket being of a shape conforming to the exterior surface desired on the finished nut, in this case, hexagonal, and rounded at the bottom to conform to the rounded end of the blank 1b, and there being at the bottom of the die a series of castellation forming projections 3. 4 indicates a reciprocating punch or pressure member, which is operated, by any suitable means, not shown in the drawings, to descend against the nut blank and partially form castellations on the blank by compressing the blank against the castellation forming projections. 5 is a "knockout", which during the castellation forming operation is held stationary in the position identified in Fig. 4, and which, after the blank has been compressed in the die and the partial castellations formed thereon, is raised by any suitable means, not shown, to eject the blank from the die.

It will be observed that the lower end of the punch 4 is rounded at 4a and the top of the knockout member 5 is likewise rounded at 5a. This construction allows the metal of the blank when compressed by the descent of the punch to flow inwardly to form projecting webs 11, which webs are engaged by the knockout member in its ascent and form the means by which it acts to eject the blank from the die.

The lower end of the punch 4 projects into the interior of the nut blank, and serves to preserve the general internal rounded form of the blank during the compression, and the upper end of the knockout member 5 which projects within the lower part of the nut blank likewise acts to preserve the general rounded internal bore of the lower part of the nut blank during the compressing operation.

In previous apparatus of this general type, castellations on the nut have been formed complete at one operation, the castellation forming projections being of shape and size adapted to this end. We have found, however, that there is a tendency with such apparatus to cause breakage of the die, which tendency can be avoided by partially forming the castellations in one operation, and completing them in a second operation. It will be seen that the partial castellation-forming projections shown in Figs. 4 and 5 are not formed with parallel sides, but with sides which converge radially in a direction toward the center of the nut, as indicated at 6 (Fig. 5). By shaping the castellating projections in this manner, we avoid wedging action during the compression of the metal which is present when the castellating projections have their sides parallel and which has a tendency to cause breakage of these castellating projections. When castellating projections having the shape disclosed in Fig. 5 are used, the space intervening between adjacent castellating projections is not wedge-shaped, as it would be if the sides of the individual castellating projections were parallel; and there is, therefore, a greater freedom allowed to the metal of the blank to flow toward the center of the blank without doing damage.

We also shape the castellating projections in such a manner that they slope axially toward the center of the die, that is to say, they are inclined with reference to the line of motion of the punch 4, as shown at 7 (Fig. 4), instead of having their operative surfaces at right angles to the line of motion of the punch, as in previous apparatus.

The use of this form of castellation-forming projections results in there being left, between the partially formed castellations 8 on the blank, intervening portions of the metal 9 (Fig. 6) having their outer sides 10 (Fig. 4) sloping with reference to the axis of the nut, in a position to be more effectively removed by the apparatus for completing the castellations, hereinafter described; and also tends to prevent breakage.

The result of the partial castellation forming operation produced by the apparatus of Fig. 4 is to form upon the blank partial castellations 8 as indicated in Fig. 6. Portions of the metal of the nut are, as above stated, forced inwardly into the central bore of the nut by this operation, as indicated at 11, Fig. 4, against which portion the knockout member engages to eject the blank from the die.

We next subject the blank to apparatus designed to complete the castellations, which apparatus is illustrated in Figs. 7 and 8. Referring to these figures, 12 indicates a castellation forming member fixedly supported on the base 13, and having a series of vertically extending external ribs 14 terminating in castellation forming surfaces 15, placed in the bottom of a die or socket 16, in which the blank, in the form shown in Fig. 6, having partially formed castellations, is now inserted. This socket member, like the socket member of Fig. 4, is shaped internally to correspond to the desired external shape of the nut. The castellation forming surfaces 15 are so placed as to register with the spaces 9 between the partially formed castellations 8 resulting from the operation of the apparatus shown in Figs. 4 and 5. 17 is a reciprocating punch or pressure member which is operated, by mechanism not shown, to force the blank inwardly into the socket against the castellation forming surfaces 15, in order to complete the castellations, by forcing inwardly toward the center of the nut the webs 9 left between the partially formed castellations by the apparatus of Fig. 4.

18 is a "knockout" member consisting of a disc of metal 19, carrying a series of vertically extending rods 20. Said disc 18 is cut away at its central portion 21 (Fig. 9) so as to allow the castellation forming member 12 to be inserted through said perforation 21, the knockout member thus having a sliding engagement on the member 12. The rods 20 of the knockout member are so placed and shaped as to fit loosely in the spaces between the vertical ribs 14 on the member 12, and when the knockout member is raised the upper ends of these rods pass between the castellation forming surfaces 15, and lift the nut so as to eject it from the die after the castellations have been formed. This knockout member is caused to rise, in timed relation with the ascent of the pressure member 17, by any desired form of mechanism, such as a cam, not shown. After the nut blank has been ejected from the die, the knockout member again descends to its inoperative position under the action of gravity, or is forced down by the descent of another nut blank under the pressure of the pressure member 17.

It will be seen that the castellation forming surfaces 15 in this apparatus extend completely across the thickness of the nut blank wall, and that they therefore completely clear away the webs of metal 9 left between the partially formed castellations 8 resulting from the operation of the apparatus shown in Figs. 4 and 5. It will be observed, moreover, that these surfaces 15, although their sides do not converge radially toward the center of the socket as do those of the projections 3 (Fig. 5) do, like the projections 3 (Fig. 5) have their upper surfaces angled or sloping with reference to the line of motion of the punch 17, as at 23 (Fig. 7). The result of this angling is to cause the webs of metal 9, intervening between the castellations, to be forced inwardly toward the center of the nut blank as at 24 (Fig. 7) when the blank is compressed in the apparatus. If desired, the castellation forming surfaces 15 may be formed with sides converging radially toward the center of the socket.

It will be observed that in this apparatus, the castellation forming projections, while operatively a part of the die member and not of the punch, are nevertheless not integral with the die member. They can therefore be readily removed for repair or renewal without destruction of the die member proper.

Fig. 10 shows the blank after treatment in the apparatus of Fig. 7, with said inwardly projecting portions of the metal 24 and also with the inwardly projecting portions of metal 11, resulting from the operation in the apparatus of Fig. 4. We now subject the blank to another punching operation, in apparatus of any desired form (not shown) to remove the portions of the metal left projecting inwardly from the walls of the blank by the preceding operations. The blank, after having been subjected to this further punching operation, is shown in Figs. 11 and 12, the finished castellations being indicated at 25.

The nut is now completed except for tapping the internal screw-thread, which is the final step in the process of manufacture. Fig. 13 shows the finished nut screw-threaded internally.

We form the die or socket member 2 (Fig. 4) and the die or socket member 16 (Fig. 7) with their sides slightly converging or tapering from the opening into which the blank is inserted to the bottom of the socket, as indicated, and by this means we greatly facilitate the operation of ejecting the compressed blank from the die after the compressing operation. In practice we prefer to taper each of the sides of the sockets about 1–100 of an inch—i. e., to make the diameter of the socket about 2–100 of an inch greater at the top than at the bottom.

By the use of the processes herein described, we are able largely to prevent breakage of the dies and to lengthen the life of the operating members.

What we claim as new and desire to secure by Letters Patent is:—

1. The process of making castellated nuts which consists in first forming, by compression, a series of partial castellations along the edge of the nut, and then in a second operation removing the intervening metal left between the partially formed castellations in the first operation, thereby completing the castellation.

2. The process of making castellated nuts which consists in first forming by compression of a nut blank partial castellations on said blank, and then by a separate operation completing the castellations.

3. That step in the process of making castellated nuts which includes compression of a tubular nut blank between a die member and a pressure member, one of which members carries castellation-forming projections, and in said operation forcing portions of the metal inwardly within the central bore of the blank, and then utilizing said inwardly projecting portions of the metal as a means for engaging the blank to eject it from the die.

4. The process of making castellated nuts which consists in partially forming castellations on a blank by compression of the blank in a die, ejecting the nut blank from said die by engagement of a knockout member with portions of metal of the nut forced inwardly in said operation, completing the castellations in a subsequent operation, removing said internally projecting portions of metal, and internally screw-threading the nut.

5. The process of making a castellated nut which consists in compressing an open-ended tubular nut blank between a die member and a pressure member, one of said members carrying castellation-forming projections.

In witness whereof, we have signed our names to this specification.

HAROLD CALDWELL PECKHAM.
HERBERT P. SWEET.